United States Patent [19]

Peterson

[11] 4,268,338
[45] May 19, 1981

[54] METHOD AND APPARATUS FOR RF SEALING OF THERMOPLASTIC LAYERS

[75] Inventor: Everett A. Peterson, Roslyn Heights, N.Y.

[73] Assignee: Peterson Electronic Die Co., Mineola, N.Y.

[21] Appl. No.: 67,738

[22] Filed: Aug. 20, 1979

[51] Int. Cl.³ .............................................. B29C 27/04
[52] U.S. Cl. .................................. 156/251; 156/273; 156/289; 156/380; 156/498; 156/515; 156/583.1; 219/10.53; 219/10.81
[58] Field of Search ............... 156/273, 380, 251, 515, 156/498, 289, 583.1; 219/10.41, 10.43, 10.53, 10.81

[56] References Cited

U.S. PATENT DOCUMENTS

| | | | |
|---|---|---|---|
| 2,307,344 | 1/1943 | Zottu | 156/273 |
| 2,422,525 | 6/1947 | Brown | 219/10.81 |
| 2,714,416 | 8/1955 | Fener | 156/251 |
| 2,961,031 | 8/1961 | Fener | 156/583 |
| 3,047,991 | 8/1962 | Siegal | 53/182 |
| 3,198,685 | 8/1965 | Kopito | 156/583 |
| 3,334,005 | 8/1967 | Fener | 156/583 |
| 3,440,124 | 4/1969 | Schwartzkopf | 156/423 |
| 3,450,856 | 6/1969 | Buck | 219/10.81 |
| 3,531,621 | 9/1970 | Beck | 219/243 |
| 3,573,140 | 3/1971 | Griffith | 156/583 |
| 3,912,575 | 10/1975 | Zelnick | 156/515 |
| 3,944,454 | 3/1976 | Burgheimer | 156/273 |
| 4,016,025 | 4/1977 | Peterson | 219/10.81 |

Primary Examiner—Michael G. Wityshyn
Attorney, Agent, or Firm—Lewis H. Eslinger

[57] ABSTRACT

Two or more layers of nonpolar thermoplastic film are bonded together by application of an RF current. The layers of thermoplastic film are pressed against a thin electrode plate, which lies atop a thin sheet of dielectric material supported on a conductive electrode die having a face or configuration to define the shape of the seal to be formed between the layers. RF current is applied to the electrode plate and to the electrode die, generating localized heat in the portions of the dielectric sheet overlying the die until the thermoplastic material has softened sufficiently to form a seal. A release agent, such as a sheet of polytetrafluoroethylene, can be provided on one surface of the electrode plate to prevent the thermoplastic material from sticking to the electrode plate.

24 Claims, 4 Drawing Figures

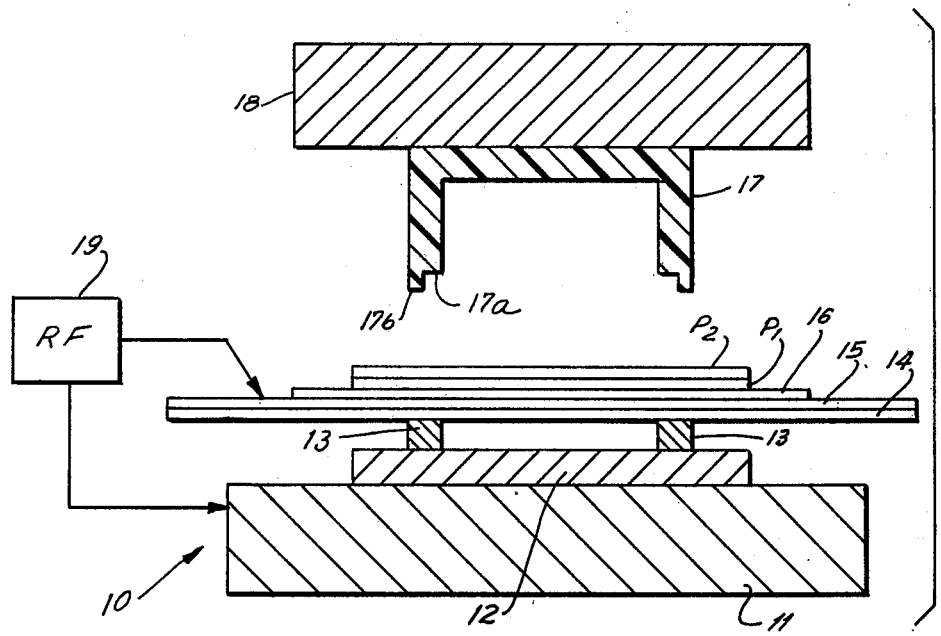
FIG. I
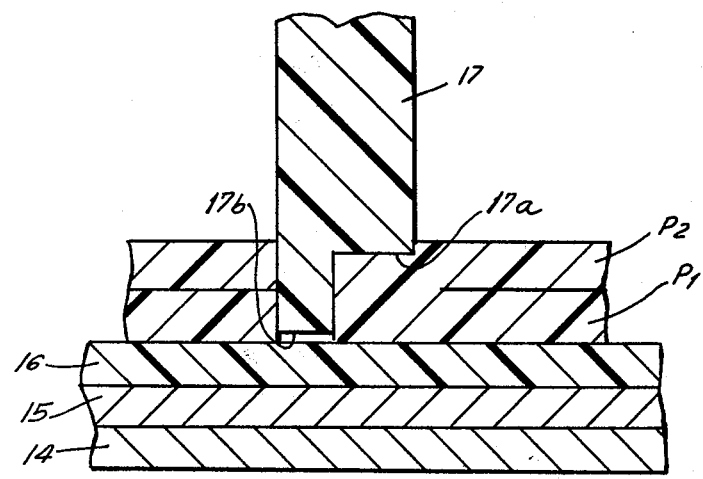
FIG. IA

METHOD AND APPARATUS FOR RF SEALING OF THERMOPLASTIC LAYERS

FIELD OF THE INVENTION

The present invention relates to a method and apparatus for sealing sheets or layers of thermoplastic material to one another.

BACKGROUND OF THE INVENTION

Polyethylene films are well suited for use in disposable articles formed from plural layers of plastic material, but no suitable welding or sealing technique has heretofore been developed to enable polyethylene to be used where now only vinyl is being used. For instance, polyethylene film is well suited to uses in the medical field where vinyl is presently used, such as in the construction of disposable cholestomy collection bags and blood bags. The number of such uses is growing. Polyethylene, a non-polar material, is approved for use in cholestomy bags and blood bags, but its use therein is hindered by difficulties in fabrication. The articles constructed of polyethylene can be made of much thinner film than those constructed of vinyl, because of the superior resistance of polyethylene to permeation of fluids therethrough. Furthermore, because of the rising cost of petroleum for use as a chemical feedstock, the thinner polyethylene film affords a decided cost advantage over the thicker vinyl film. In this regard, it is noted that other non-polar materials such as acetate, do not require petroleum in their manufacture, and would also provide a cost advantage.

Unfortunately, because polyethelene is a non-polar material, it is unsuited for dielectric heating technique, and therefore, unlike vinyl or other polar materials, could not heretofore be sealed thermally by any conventional application of radio frequency (RF) current to the material. Thus, films of polyethylene or other non-polar thermoplastic materials have been difficult to employ in fabrication of the above-mentioned medical articles or other like articles.

BRIEF DESCRIPTION OF THE PRIOR ART

In previous attempts to seal layers of non-polar plastic material, the so called "impulse heating" technique has been used. One such attempt is disclosed in U.S. Pat. No. 2,714,416. According to that patent, during a heating cycle current is passed through a strip or band of resistive material for a short time until the thermoplastic material pressed thereagainst is melted sufficiently to form a seal. Unfortunately, the apparatus is unable to dissipate heat very rapidly and, therefore, there is no real cooling cycle and the thermoplastic material cannot be held under cold pressure until the seal sets. Another such attempt is described in U.S. Pat. No. 3,047,911. According to that patent, current is passed through a nichrome wire held in close proximity to the thermoplastic material to be sealed. The wire heats rapidly providing a hot sealing cycle, and then cools rapidly enabling a cold clamping cycle to take place. Unfortunately, this technique does not readily lend itself to the forming of arcuate or other arbitrary shapes, for the nichrome wire must be held in a straight line and biased with a spring to allow for expansion of the wire during the hot, or sealing cycle.

Shaped dyes heated with resistive heaters have also been used for sealing polyethylene. However, it has not been possible with heated dies to provide a cool clamping cycle, and so it has been difficult for the thermoplastic seal to set, since it cannot be held under cold pressure.

The present invention overcomes the foregoing problems.

OBJECTS AND SUMMARY OF THE INVENTION

It is an object of the present invention to provide a method and apparatus for sealing two or more layers of non-polar thermoplastic material to one another in a manner that avoids the above-mentioned problems inherent in the prior art.

It is a further object of this invention to provide a method and apparatus for sealing two or more layers of thermoplastic material to one another so as to form arbitrary shapes.

It is yet another object of this invention to provide a method and apparatus for sealing two or more layers of non-polar thermoplastic material in a manner that avoids the need for resistive heating, and provides both a hot sealing cycle and a cold clamping cycle.

It is a still further object of this invention to provide a method and apparatus for sealing two or more layers of non-polar thermoplastic material to one another in a speedy and economical manner.

According to an aspect of this invention, two or more layers of thermoplastic material, such as polyethylene or acetate, are bonded to one another to form a seal by pressing the layers of thermoplastic material against a thin conductive electrode plate, which is disposed atop a thin sheet of dielectric material which is, in turn, supported on a conductive electrode die having a face, or configuration to define the shape of the seal to be formed between the layers. RF current is applied to the electrode plate, on the one hand, and to the electrode die, on the other, thereby causing localized heating in the portions of the dielectric sheet overlying the die until the thermoplastic material has softened sufficiently to form the seal. Then the RF current is removed while pressure is maintained on the thermoplastic material against the electrode plate until the thermoplastic material has cooled sufficiently to set. Means provided for pressing the layers of thermoplastic material against the electrode plate can include a non-conductive upper pressure die having the same configuration as the conductive electrode die. Such upper die can be profiled so as to apply more pressure at the outer edges than at the inner edges of its configuration, so that the thermoplastic layers are cut through at the portions thereof corresponding to the outer edges, but are sealed together at the remaining portions. A release agent, such as a sheet of polytetrafluoroethylene (i.e., as sold under the trademark Teflon by E. I. duPont deNemours & Co.) can be provided on the surface of the electrode plate remote from the conductive die in order to prevent the layers of thermoplastic material from sticking to the resistive sheet.

BRIEF DESCRIPTION OF THE DRAWINGS

FIG. 1 is a sectional view of a first embodiment of the sealing apparatus according to the present invention.

FIG. 1A is an enlarged sectional view of a portion of FIG. 1 showing the sealing operation.

DESCRIPTION OF THE PREFERRED EMBODIMENTS

Figure 2:
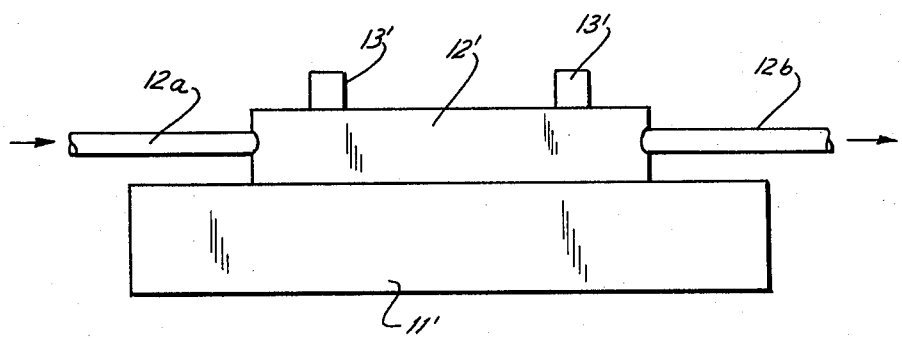
FIG. 2 is an elevational view of alternate construction of a portion of the apparatus of FIG. 1.

With reference to the drawings, FIG. 1 shows a device 10 for sealing two layers $P_1$, $P_2$, of polyethylene film or other nonpolar thermoplastic material to one another. A metal block 12 is mounted on a support 11, such as the frame or lower jaw of a conventional reciprocating press. The block 12 can act as a heat sink. A lower conductive electrode die 13, formed of metal such as brass or aluminum, is fixed on block 12 in any convenient manner. It is preferred to form the electrode die 13 from $\frac{1}{8}''$ by 1" brass stock, bent to a desired shape and mounted on half-inch aluminum plate to serve as block 12. The electrode die 13 will be on the electrical ground side of the press, and will support a dielectric sheet 14 and an electrode plate 15 as described below.

The upper surface or face 13a of die 13 is relatively flat and has any desired regular or irregular configuration in plan so as to define the shape which the seal formed between the polyethylene layers $P_1$, $P_2$ will take on.

A thin sheet or layer 14 of dielectric material preferably formed of a sheet of phenolic impregnated paper, 0.010–0.015 inches in thickness, is supported on the upper surface 13a of die 13. The dielectric material, is, coincidentally, a good electrical insulator. While a phenolic-impregnated resin, such as bakelite, is preferred, other dielectric material such as fish paper (highly compressed fiber) would be suitable.

Next, a conductive electrode plate 15, preferably a nichrome steel sheet less than about 0.01 inch thick, is provided atop the dielectric sheet 14. Such an electrode plate 0.004 inches thick has been found to be quite suitable. Nichrome steel is advantageous for use as the electrode plate 15 because of its superior resistance to high temperatures. Nichrome steel is also more resistant to corrosion than are other conductors such as aluminum, brass, or ordinary sheet steel, and further exhibits superior strength and resistance to tearing when used in a profiled-die application as described below.

The electrode plate 15 is constructed to be quite thin so that heat can be quickly transferred therethrough during the heating portion of a sealing operation, and is desirably relatively large in area to help dissipate heat during the cooling portion of the sealing operation. The thin construction of the nichrome steel electrode plate 15 does not substantially increase its resistance to current, since the RF currents used in a sealing operation will only be carried in the skin of the electrode plate 15.

It is advantageous to make the dielectric sheet 14 the same size as the electrode plate 15 to facilitate an exchange of die 13 for one of another configuration without the necessity of removing the sheet 14 and plate 15.

Because the nichrome steel electrode plate 15 has a very smooth finish, as a general rule thermoplastic material will not stick to it. However, adverse operating conditions and/or the use of a complex die configuration may require the use of a release agent to prevent the thermoplastic material from sticking to the electrode plate 15. In the herein-described embodiment, a 0.002-inch polytetrafluoroethylene (Teflon) sheet is optionally provided on the surface of the electrode plate 15 remote from the lower die 13 (i.e., the side of the sheet which contacts the polyethylene layer $P_1$).

Alternatively, a thin silicone-coated paper could be used. Periodic spraying of the electrode plate 15 with a silicone release agent would be satisfactory in many applications.

An upper or pressure die 17 is rigidly mounted on a head 18 or upper jaw of the press. The head 18 and upper die 17 are mounted for reciprocating movement in the vertical direction in any convenient manner (not shown) known to those skilled in the art, e.g., a hydraulic ram, so that after the polyethylene film layers $P_1$, $P_2$ are inserted into the device 19, the upper die 17 can be moved to press down against layers $P_1$, $P_2$ during the sealing operation. The upper die 17 is provided with the same configuration as the lower die 13, and is arranged to be in registration therewith.

The upper pressure die 17 is completely isolated from the RF current applied to the lower electrode die 13 and to the electrode plate 15. While the upper die 17 could be formed of brass or aluminum, provided the above constraint is observed, it is preferred to form the upper die 17 from a nonconductive material. In the described embodiment, Delrin, an acetal synthetic resin sold by E. I. duPont deNemours & Co., is preferred for the upper die 17, because it is a high-impact resistant, high temperature resistant material, and will hold up well and not distort under compression forces experienced during a sealing operation. In addition, acetal such as Delrin has good non-stick proprieties. Polytetrafluoroethylene, which has superior non-stick properties, can also be used.

As shown in FIGS. 1 and 1A, upper jaw 17 is provided with a profiled face 17a to afford a greater amount of pressure at the outer edges 17b of the die for reasons to be described below.

Further, a radio frequency (RF) generator 19, of conventional construction and of the type commonly used in dielectrically sealing vinyl films, is connected at its high voltage, or "hot" side, to electrode plate 15 and at its other, or "ground", side to the support or frame 11. The acetal upper die 17 and head 18 are held in isolation from either side of the RF generator 19. The RF current provided from generator 19 should have a frequency of at least about 10 MHz, preferably between 15–30 MHz. An RF frequency of 27 MHz has been found suitable.

The above described construction of the electrode die provides an effective insulation of approximately an inch and a half of air between the ground side of the generator 19 and the non-working portions of the dielectric sheet 14 and electrode plate 15 (i.e. those portions not overlying the electrode die 13). By effectively bringing the dielectric sheet 14 and the electrode plate 15 into contact with RF ground only over a minimal surface area, the requirement for operating power is reduced to a minimum as compared with the power required if the sheet 14 and plate 15 were held in contact with RF ground for a considerable portion of their area.

The operation of the apparatus of FIG. 1 can be described quite simply as follows. The layers of polyethylene film $P_1$, $P_2$ are laid atop one another on the electrode plate 15 (or upon the Teflon sheet 16, if the latter is used). Then the acetal upper die 17 is lowered to bear down upon the polyethylene layers $P_1$, $P_2$, so as to apply pressure to the latter in the desired area between the complementary dies 13 and 17. When pressure is applied between upper die 17 and lower die 13, the RF generator 19 is actuated, causing RF current to flow through the circuit formed by the electrode plate 15, dielectric sheet 14, lower conductive die 13, metal block 12, and support 11. The conductive lower die 13 causes the energy provided from the RF generator to be concentrated to those portions of the dielectric sheet 14 which overlie the lower die 13. Thus, heat is generated in that portion of the dielectric sheet 14, traverses the thin electrode plate 15, and enters the polyethylene layers $P_1$, $P_2$ to heat the same until softened enough to form a weld or seal. Then the RF generator 19 is turned off. Because the dielectric sheet 14 and electrode plate 15 are quite thin, they cool virtually immediately. The lower die 13, being constructed of brass or aluminum, which are good conductors of heat, assists in the cooling by conducting the heat from the sheet 14 and plate 15 to the metal block 12, which acts as a heat sink.

The profiled face of the die, which affords a greater amount of pressure at the outer edges of the configuration of the die, will cut through the polyethylene sheets $P_1$, $P_2$, when the latter are heated as seen in FIG. 1A, but will provide only enough pressure to the portions of the layers $P_1$, $P_2$ corresponding to the remainder of the configuration of the dies 13 so as to form a seal between the polyethylene sheets $P_1$, $P_2$.

If a seal only is required, the upper or pressure die 17 is machined so that its face provides a flat, common plane. If both a seal and a parting line for removing excess waste material from the outer periphery of the seal is desired, then the upper die 17 is machined in such a manner that its face is formed along several planes. In this way one edge of the pressure die 17 sinks further into the thermoplastic $P_1$, $P_2$ to form the parting line, while the remaining area of the die 17, relieved above this edge, only applies sufficient pressure to achieve a weld between the two layers of thermoplastic material $P_1$, $P_2$. If such a profiled pressure die 17 is used, it is advantageous to form it of Delrin. Delrin, when machined smooth, has a superior non-stick surface, and there is little tendency for it to accumulate melted residue from the sealed layers of thermoplastic material $P_1$, $P_2$. After the seal or weld has cooled sufficiently to set, (typically a matter of seconds), the upper head 18 and upper die 17 are raised, and the article formed of the welded sheets $P_1$, $P_2$ is removed from the apparatus.

If desired, a liquid-cooled assembly can be used in place of the simple metal block 12 of the foregoing embodiment. In particular, as shown in FIG. 2, in which similar reference numerals (but primed) are used to denote elements similar to those shown in FIG. 1, a heat sink 12', adapted for liquid cooling of die 13', rests on the support 11' which is the frame or lower jaw of the press. An inlet pipe 12a for supplying cool liquid to an interior circuitous path formed in block 12', and an outlet pipe 12b for the expelling of warm liquid therefrom, can be connected to a conventional heat exchanger, or can be arranged to pass a non-recirculating liquid, such as water. The adaptation as shown in FIG. 2 will draw heat more rapidly from the ends off the die 13' adjacent to the electrode plate 15, thereby permitting faster cooling and setting of the thermoplastic weld or seal.

The foregoing arrangements, as shown in FIGS. 1 and 2, are well suited to the forming of articles from relatively thin films of polyethylene, especially those films between 0.00075 inch to 0.005 inch in thickness. Polyethylene films in that range of thickness would be of the greatest use in the construction of medical articles, such as collection bags, blood bags, and the like. Nevertheless, there are many uses which may require articles formed of polyethylene film of a greater thickness.

Figure 3:
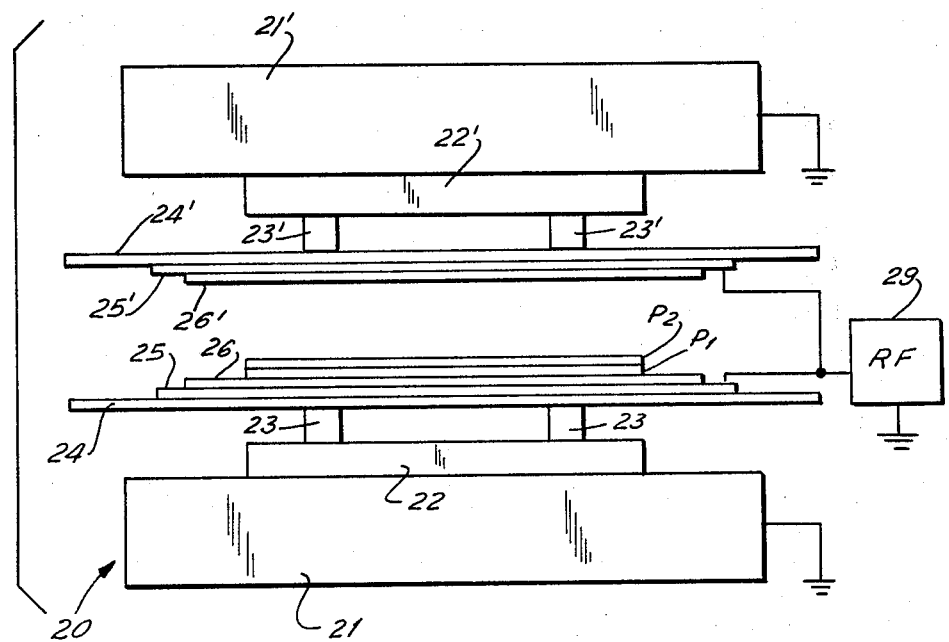
FIG. 3 is a sectional view of a second embodiment of the sealing apparatus according to the present invention.

In order to provide a seal between relatively thicker sheets of polyethylene, the embodiment of the present invention as shown in FIG. 3 is provided to heat the thermoplastic layers $P_1$, $P_2$ from both above and below to form a weld or seal between the layers. In FIG. 3, reference numerals similar to those in FIG. 1 are used but increased by ten over the latter, to identify similar elements. Primed reference numerals identify elements comprising the upper portion of the FIG. 3 embodiment. Thus, the device 20 for sealing relatively thick layers of nonpolar thermoplastic material, such as the polyethylene layers $P_1$, $P_2$, includes a first support 21, or lower jaw of a press, and a second support 21', or upper jaw of the press. Respective lower and upper blocks 22, 22', and lower and upper conductive electrode dies 23, 23' are provided thereon. Lower and upper dielectric sheets 24, 24' are provided between the respective dies 23, 23' and lower and upper electrode plates 25, 25'. A release agent 26, 26', which can be a thin polytetrafluoroethylene sheet, is optionally included on the respective electrode plate 25, 25'. An RF generator 29 is connected at the hot side thereof to both the lower and upper electrode plates 25, 25' and at the other side to ground. The supports 21, 21', i.e., the lower and upper jaws of the press, are also connected to ground. In the device of FIG. 3, heat is transferred from both electrode plates 25, 25' towards the mating surfaces of the polyethylene sheets $P_1$, $P_2$, rather than from only a single electrode plate. This arrangement enables a good seal to be formed without substantial deterioration of either polyethylene layer $P_1$ or $P_2$.

Either or both of lower and upper dies 23, 23' can be provided with a profiled configuration as shown for the upper die 17 of FIG. 1. The electrode plates 25, 25' are preferably formed of very thin nichrome sheet steel, and such plates 25, 25' would, under pressure, assume the profile of the respective dies 23', 23'. Thus, the device shown in FIG. 3 can be adapted both to cut and to seal articles formed of relatively heavy sheets of polyethylene. In that case, the use of thin nichrome sheet steel as the electrode plate will permit it to assume the contour of a profiled or multi-plane die with much less propensity to tear or break than would brass or ordinary steel sheet.

Furthermore, even without such profiled dies, there are many articles, such as tank liners, and the like, where only a sealing operation would be required.

Upon occasion it may be necessary to cut out a substantial portion of the electrode plates 25, 25' and dielectric sheets 24, 24' to achieve sufficient clearance, for instance when film of a very thick material such as polyether urethane is to be sealed. In that case the material interior to the perimeter of the dies 23, 23' should be removed, but as much as possible of the remainder of the plates 25, 25' should be left attached to act as a dissipating surface during the cooling cycle.

Although illustrated embodiments of this invention have been described in detail hereabove with reference to the accompanying drawings, it is to be understood that the invention is not limited to those precise embodiments, and that various changes and modifications may be readily effected by persons of ordinary skill without departing from the spirit or scope of this invention which is to be defined by the appended claims.

I claim:

1. A method of bonding layers of thermoplastic material to one another to form a seal comprising the steps of, pressing said layers of thermoplastic material against an electrode plate, supporting said electrode plate on a conductive electrode die, separating said electrode plate and electrode die by a thin sheet of dielectric material, said conductive die having a configuration to define the shape of the seal formed between said layers;

applying an RF current to a circuit formed by said electrode plate and said electrode die, thereby causing localized heating of the portions of said thermoplastic material overlying said electrode die until said thermoplastic material has softened sufficiently to form the seal; and removing said RF current while maintaining pressure between said layers of thermoplastic material and said electrode plate until said thermoplastic material has cooled sufficiently to set.

2. The method according to claim 1 wherein said step of pressing is accomplished by applying a pressure die of the same configuration as said electrode die and in substantial registration therewith against the surface of said thermoplastic material remote from said electrode die.

3. The method according to claim 2, including the step of applying more pressure at the outer edges of said pressure die so that said thermoplastic layers are cut through at portions thereof corresponding to said outer edges, but are sealed at the portions corresponding to the remainder of the configuration of the dies.

4. The method according to claim 3 wherein said step of applying more pressure includes forming a parting line for promoting the removal of excess material from the periphery of the seal.

5. The method according to claim 1, wherein said RF current has a frequency of at least 10 Megahertz.

6. The method according to claim 4, wherein said RF current has a frequency of 15-30 Megahertz.

7. The method according to claim 1, further comprising, after removing said RF current, the step of circulating liquid to said electrode die to carry away heat generated by said RF current.

8. Apparatus for bonding two or more layers of thermoplastic material to one another to form a seal therebetween comprising, at least one conductive electrode die having a configuration in plan to define the shape of the seal to be formed between said layers of thermoplastic material a sheet of dielectric material disposed on said electrode die;

an electrode plate on said sheet of dielectric material and separated thereby from said electrode die to support the layers of thermoplastic material;

means for pressing said layers of thermoplastic material against said electrode plate; and means for applying an RF current to a circuit formed by said electrode die and said electrode plate so that sufficient localized heat is formed in the portions of said dielectric material overlying said electrode die to cause said thermoplastic material to soften sufficiently to form the seal.

9. Apparatus according to claim 8, wherein said pressing means includes a pressure die having the same configuration as said electrode die.

10. Apparatus according to claim 9, wherein said dies have outer and inner edges, and said pressure die is arranged to apply more pressure at the outer edge than at the inner edge so that said thermoplastic layers are cut through at the portions thereof corresponding to said outer edges, but are sealed together at the portions corresponding to the remainder of the configuration of the die betwen said outer and inner edges.

11. Apparatus according to claim 9, wherein said pressure die is formed of a nonconductive material.

12. Apparatus according to claim 11, wherein said non-conductive material is acetal.

13. Apparatus according to claim 11, wherein said non-conductive material is polytetrafluoroethylene.

14. Apparatus according to claim 8, wherein said electrode plate comprises a nickel-chromium alloy.

15. Apparatus according to claim 14, wherein said electrode plate is nichrome sheet steel less than about 0.01 in thickness.

16. Apparatus according to claim 8, wherein said sheet of dielectric material is less than about 0.015 inches thick.

17. Apparatus according to claim 8, wherein said dielectric material is phenolic-impregnated paper.

18. Apparatus according to claim 8, wherein said dielectric material is fish paper.

19. Apparatus according to claim 8 further comprising releasing means on the surface of said electrode plate remote from said electrode die for preventing said layers from sticking to said plate.

20. Apparatus according to claim 19, wherein said releasing means includes a sheet of polytetrafluoroethylene.

21. Apparatus according to claim 8 wherein said RF current has a frequency of at least 10 Megahertz.

22. Apparatus according to claim 8 further comprising liquid cooling means for removing heat from said electrode die by means of a flowing liquid.

23. Apparatus for bonding two or more layers of thermoplastic material to one another to form a seal therebetween comprising, upper and lower superposed conductive electrode dies having generally complementary configuration in plan to define the shape of the seal formed between said layers of thermoplastic material;

upper and lower sheets of dielectric material each supported on a respective one of said conductive dies;

upper and lower electrode plates each disposed on a respective one of said dielectric sheets;

means for moving at least one of said upper and lower dies, together with its respective dielectric sheet and electrode plate toward and away from the other for selectively pressing the sheets against said layers of thermoplastic material; and means for applying an RF current to a circuit formed by said upper electrode die and electrode plate and to a circuit formed by said lower electrode die and electrode plate, so that sufficient localized heat is formed in the portions of said dielectric sheets overlying the respective dies to cause said thermoplastic material to soften sufficiently to form a seal.

24. Apparatus according to claim 23, further comprising releasing means disposed on the side of each said sheet remote from the respective die for preventing said layers of thermoplastic material from sticking to said sheets.

* * * * *